┌─────────────────────────────────────────┬──────────────────────┐
United States Patent Office             │ 2,867,410            │
│                                         │ Patented Jan. 6, 1959│
└─────────────────────────────────────────┴──────────────────────┘

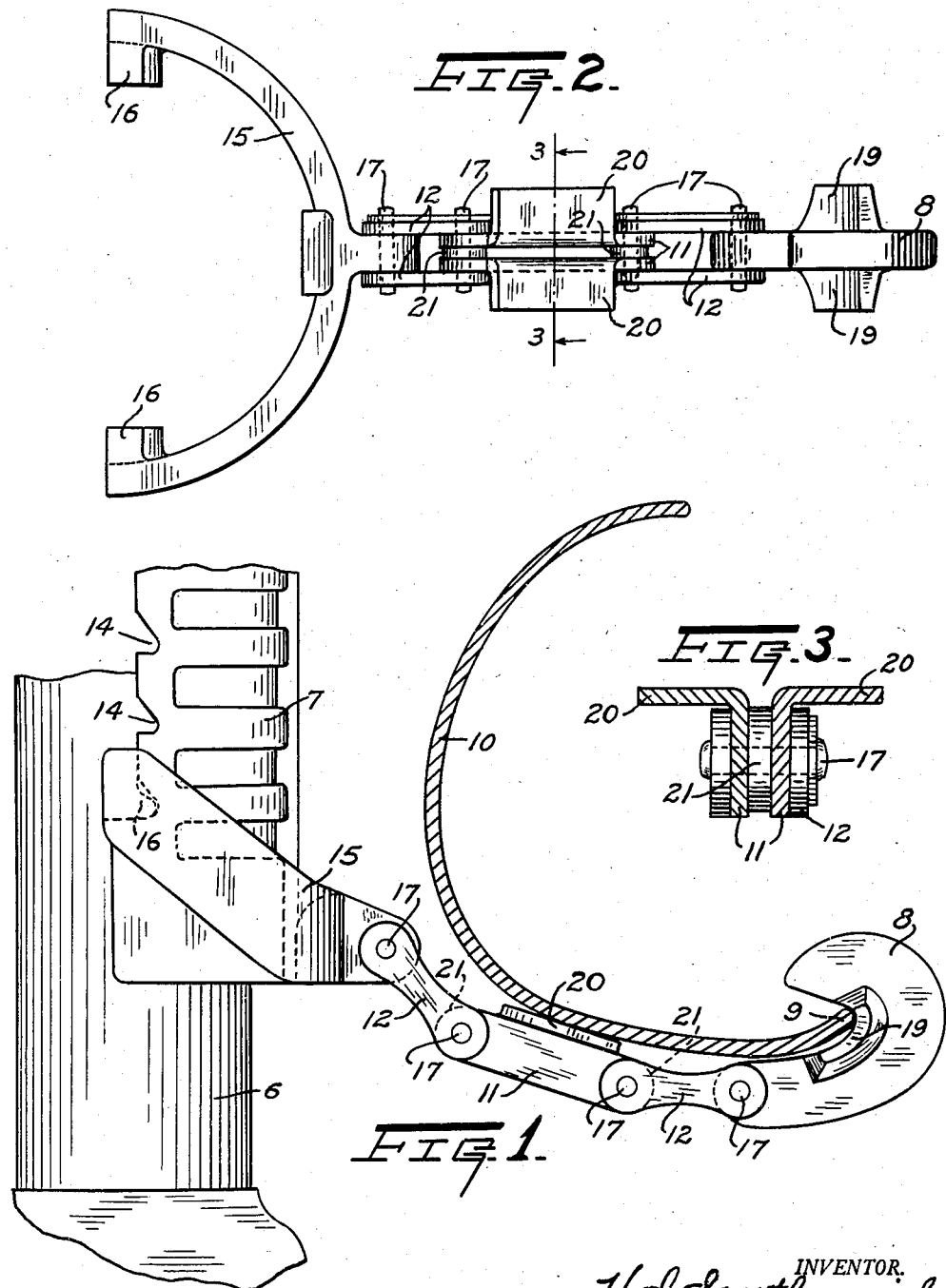

2,867,410

BUMPER TYPE VEHICLE LIFT ATTACHMENT

Harold I. Southerwick, Whitefish Bay, Wis., assignor to Blackhawk Mfg. Co., West Allis, Wis., a corporation of Wisconsin Application February 9, 1955, Serial No. 487,046

2 Claims. (Cl. 254—133)

This invention relates in general to improvements in devices for facilitating the raising and lowering of vehicles, and relates more specifically to improvements in the construction and operation of bumper type automobile lifting accessories.

The primary object of the present invention is to provide an improved appliance for effectively transmitting the lifting force of a jack to a vehicle through its bumper.

Many different types of mechanical and hydraulic jacks especially adapted to lift automobiles, trucks, trailers and other vehicles by application of the lifting force to a bumper of the vehicle, have heretofore been proposed and used extensively. With most of these prior jack assemblages, the lifting force is applied by means of a platform or the like cooperable with the bottom of a bumper bar and which is connected to a movable member of the jack either directly or by means of an intervening motion transmitting connection of some kind. Since these vehicle bumpers are usually formed of channel bar stock or of sheet metal having curved cross-sectional contour and plated external surfaces, both types having inwardly directed lower edge portions, the prior devices for transmitting the elevating forces from the jacks to the bumper bars were not satisfactory primarily because they were not adapted to eliminate slippage or because they tended to mar the plated and polished bumper surfaces.

It is therefore an important object of the present invention to provide an improved motion transmitting attachment for transferring the lifting force from the elevating member of a jack to a vehicle bumper bar in a manner whereby slippage is positively avoided and danger of marring the bumper surface is eliminated.

Another important object of this invention is to provide an improved vehicle lift especially adapted for cooperation with bumper bars having inwardly directed lower edge portions, and which will automatically provide increased gripping action while the vehicle is being elevated.

A further important object of the invention is to provide an improved vehicle lifting jack accessory for connecting the movable member of the jack with a bumper bar, which is simple and compact but exceedingly durable in construction, and which may be quickly and conveniently applied or removed.

Still another important object of my invention is to provide an improved hook and platform assemblage for transmiting the lifting force of a jack or the like to a vehicle bumper in a safe and most efficient manner.

These and other objects and advantages of the present invention will be apparent from the following detailed description from which it should be noted that the gist of the improvement is the provision of a vehicle lifting accessory for connecting the movable member of any type of jack with a vehicle bumper bar by means of a laterally widened hook engageable with the inner lower edge of the bumper cooperating with a flexible chain element pivotally connected to the hook and to the movable jack member and having thereon a similarly widened platform engageable with the bottom of the bumper remote from the hook.

A clear conception of the features constituting the improvement and of the construction and operation of a typical commercial embodiment of the invention may be had by referring to the drawing forming a part of this specification and wherein like reference characters designate the same or similar parts in the various views.

Fig. 1 is a side elevation of a vehicle lift built in accordance with my invention, showing the same associated with a fragment of one well known type of hydraulic jack and applied to a typical bumper shown in section;

Fig. 2 is a top view of the vehicle lift shown in Fig. 1, but with the hydraulic jack and the bumper omitted; and Fig. 3 is an enlarged transverse section through the platform link of the vehicle lift, taken along the line 3—3 of Fig. 2.

While the invention has been shown and described herein as having been associated with a particular type of hydraulic jack and applied to a specific form of vehicle bumper, it is not the intent to unnecessarily restrict the use of the improved lifting device to such associated or cooperating parts; and it is also contemplated that specific descriptive terms employed herein be given the broadest possible interpretation consistent with the actual disclosure.

Referring to the drawing, the improved vehicle lift shown therein, comprises in general, a hydraulic jack having a cylinder 6 and a movable lifting member 7 reciprocable relative to the cylinder; and a motion transmitting device consisting primarily of a hook 8 cooperable with the lower inwardly directed lower edge 9 of a bumper bar 10 and a flexible chain element connecting the hook 8 with the jack and having a platform link 11 adapted to coact with the lower portion of the bar 10 and which is pivotally attached to the hook 8 and to the jack by other links 12.

The hydraulic jack specifically illustrated is not an essential part of the present invention and may be replaced by any other type of mechanical ratchet or screw jack, or by other types of hydraulic jacks such as shown, for instance, in my copending application Serial No. 456,094, filed September 15, 1954. However, in the illustrated type of hydraulic jack, the vertically reciprocable lifting member 7 is adapted to be forcibly raised by the jack plunger which is movable by hydraulic pressure within the cylinder 6 in a well known manner, and the member 7 is provided with a series of notches 14. A semicircular yoke 15 having a pair of integral inwardly projecting lugs 16 at its opposite ends cooperable with any selected pair of the notches 14, has its medial portion pivotally attached to one of the chain links 12, as shown, or to an extension of the chain, by means of a pivot pin 17.

The bumper bar 10 has substantially C-shaped cross-section as shown in Fig. 1, and this cross-sectional shape varies considerably in various types of automobiles and trucks and may in some instances be a standard structural channel bar, but practically all vehicle bumpers do have an inwardly directed lower edge 9 extending therealong. The hook 8 of the improved accessory, has opposite rigid projections forming a laterally widened portion 19 which is adapted to engage this lower bumper bar edge 9 for a considerable distance, and this hook is durably constructed and is pivotally attached to one end of the adjacent chain link 12 by a pivot pin 17 while the opposite end of this link is likewise connected to the adjacent end of the platform link 11.

The platform link 11 may be composed of a pair of similar sheet metal side plates each having an outwardly projecting flange 20 at its upper portion, and a pair of spacing washers 21 confined between the side plates. These flanges 20 provide a laterally widened contact surface which is of substantially the same width as that of the laterally widened portion of the hook 19 and is automatically engageable with the lower surface of the bumper bar 10 during lifting of the vehicle, as depicted in Fig. 1. The end of the platform link 11 remote from the hook is pivotally attached to the chain link 12 nearest to the jack by another pivot pin 17, and these pins 17 also pass through the spacing washers 21. The pivot pins 17 coact with the links 11, 12 so as to permit free flexing or articulation of the chain in a plane approximately perpendicular to the hook engaged edge 9 of the bumper 10, but will not permit lateral bending of this chain.

The chain links 12 each consist of a pair of opposite side plates formed of sheet metal or the like, and while only two of these links 12 and one intervening link have been illustrated, the chain may be composed of any desired number of pivotally interconnected links especially when the improved hook and platform device is applied to a jack such as shown in my copending application hereinabove referred to. In this prior application the lifting member of the hydraulic jack has a rotary element coacting with the medial portion of an elongated chain one end of which is attached to the jack cylinder while its opposite end is attached to a bumper engaging saddle member, but no hook is utilized as in the present instance.

When the various parts of the improved bumper lift have been constructed and assembled as above described, the device may be readily associated with a hydraulic jack such as illustrated, with the aid of the yoke 15 attaching lugs 16 which may be readily applied to any selected set of the notches 14 on the movable jack member 7 which are most convenient for effecting attachment of the hook 8 to the bumper bar 10. The laterally widened portion 19 of the hook 8 may then be loosely applied to the lower bumper edge 9 and the jack cylinder 6 may be disposed in upright position near the outer face of the bumper bar 10, whereupon the jack may be operated to elevate its lifting member 7.

During this elevation of the lifting member 7, the lugs 16 of the yoke 15 will be pulled firmly into the adjacent sockets 14 and the hook portion 19 will be likewise drawn into snug engagement with the bumper edge 9, after which continued rising of the member 7 will automatically bring the platform flanges 20 of the link 11 into gentle but firm contact with the lower outer surface of the bar 10. As the lifting operation of the jack continues, the chain and hook will effectively raise the bumper 10 and the vehicle body to any desired extent, where it may be safely maintained due to the extended contact areas afforded by the hook portion 19 and the platform flanges 20 disposed remote from the hook. When the lifting member 7 is lowered, the improved device will rapidly release its firm grip on the bumper and may be readily removed.

From the foregoing detailed description of one practical embodiment of the invention it should be apparent that I have in fact provided a vehicle lift which is simple and durable in construction and highly effective in use. The improved hook and platform assemblage provides several remotely separated and laterally widened zones of firm contact with the bumper which are automatically created while the lifting force is being applied without danger of marring the bumper finish, and which co-operate with the chain to effectively prevent lateral tilting or longitudinal tipping of the vehicle. It is to be noted, however, that in some types of bumpers the bottoms of the bars 10 may not be as wide as in the particular type illustrated, and in such narrower bumpers the platform 20 will naturally engage the bumper bottom surface somewhat remote from its extreme lowermost portion. The improved device is compact and may be conveniently applied and quickly removed, and may be utilized with any type of lifting jack having an elevating member attachable to a chain of any desired length and which is provided at its end portion remote from the jack with a hook 8 and a platform 20 substantially as shown. The improved accessory may be produced in various sizes for diverse uses and can be manufactured and sold at moderate cost, and has proven highly satisfactory and successful in actual use.

It should be understood that it is not desired to limit this invention to the exact details of construction and operation of the vehicle lift herein specifically shown and described, for various modifications within the scope of the appended claims may occur to persons skilled in the art.

I claim:

1. In a bumper type vehicle lift attachment, a unitary hook having rigid opposite side projections forming a laterally widened arcuate platform adjoining a recess horizontally engageable with the lower inner edge of a bumper of C-shaped cross-section, a motion transmitting chain having one end link pivotally attached by a horizontal pin to said hook beneath the bumper remote from said platform and recess, and a jack operable element pivotally attached by a horizontal pin to the opposite end link of said chain, said chain having an intervening link pivotally associated by horizontal pins with said end links and being provided with a similarly laterally widened but flat rigid platform engageable with the bottom of the same bumper remote from said hook, and said chain links and said hook and element being relatively articulable about said horizontal pins only in a plane perpendicular to said bumper edge and bottom.

2. In a bumper type vehicle lift attachment, a unitary rigid hook having integral opposite side projections forming a laterally widened arcuate platform adjoining a recess horizontally engageable with the lower inner edge of a bumper of C-shaped cross-section, a triple link motion transmitting chain having one end link pivotally attached by a horizontal pin to said hook beneath the bumper remote from said edge, and a jack operable yoke pivotally attached by a horizontal pin to the opposite end link of said chain, the intervening link of said chain being pivotally attached by horizontal pins to said end links and provided with a similarly widened integral but plane platform engageable with the bottom of the same bumper remote from said hook, and said chain links and said hook and yoke being relatively swingable about said horizontal pins only in a plane perpendicular to said bumper edge and bottom.

References Cited in the file of this patent

UNITED STATES PATENTS

| | | |
|---|---|---|
| 1,470,481 | Popps | Oct. 9, 1923 |
| 2,470,018 | Coffing | May 10, 1949 |
| 2,476,838 | Coffing | July 19, 1949 |
| 2,529,168 | Marshall et al. | Nov. 7, 1950 |
| 2,549,862 | Thorndike | Apr. 24, 1951 |
| 2,630,297 | Hunz | Mar. 3, 1953 |